United States Patent
Realmuto et al.

(10) Patent No.: US 7,227,278 B2
(45) Date of Patent: Jun. 5, 2007

(54) MULTIPLE BI-DIRECTIONAL INPUT/OUTPUT POWER CONTROL SYSTEM

(75) Inventors: Richard A. Realmuto, Commack, NY (US); Benjamin Hartman, New York, NY (US)

(73) Assignee: Nextek Power Systems Inc., Hauppauge, NY (US)

( * ) Notice: Subject to any disclaimer, the term of this patent is extended or adjusted under 35 U.S.C. 154(b) by 486 days.

(21) Appl. No.: 10/761,979

(22) Filed: Jan. 21, 2004

(65) Prior Publication Data

US 2005/0162018 A1 Jul. 28, 2005

(51) Int. Cl.
*H02J 1/00* (2006.01)
*H02J 3/38* (2006.01)
*H02J 7/34* (2006.01)
*H02J 5/00* (2006.01)

(52) U.S. Cl. .............. 307/44; 307/45; 307/46; 307/80

(58) Field of Classification Search .............. 307/44
See application file for complete search history.

*Primary Examiner*—Robert L. Deberadinis
*Assistant Examiner*—Hal I. Kaplan
(74) *Attorney, Agent, or Firm*—Alfred M. Walker (57) ABSTRACT

A multiple bi-directional input/output power control system includes a network of functional blocks housed in a single enclosure, providing DC power to one or more DC loads, and providing control and internal pathways, sharing one or more AC and/or DC power inputs. The system feeds back AC power from the DC power source into an AC input connection, and the fed-back AC power is shared by other AC loads. The system operates at least one alternative source of DC in a dynamic manner, allowing maximization of power generating capability at respective specific operating conditions of the moment.

41 Claims, 4 Drawing Sheets

MULTIPLE BI-DIRECTIONAL INPUT/OUTPUT POWER CONTROL SYSTEM

FIELD OF THE INVENTION

The present invention relates to electrical power units for use in sharing and connecting AC alternating current and DC direct current electrical power supplies.

SUMMARY OF THE INVENTION

The Multi-Function Power Control Unit (MFPCU) of this invention is a network of functional blocks housed in a single enclosure to provide DC power to one or more DC loads. It provides control and internal pathways to share or select a variety of power inputs including AC utility power, alternative DC power sources, as well as DC power from external energy storage devices. Additionally, the MFPCU can also feed back AC power from other attached DC sources into the AC input connection to be shared by other AC loads (including other MFPCU's) within the enterprise. The functional blocks are implemented as hard wired electronic circuit boards, as software running on an internal digital processor, or as a combination of both types using state-of-the-art design techniques.

The multi-function power control unit includes the following functional blocks within its enclosure: a digital processor, a low voltage ON/OFF control block, an alternate DC source DC/DC converter, a DC isolation block, and a bi-directional AC/DC power supply with a bi-directional control module, power factor correction means, and an anti-islanding control block. In addition, the MFPCU has connectors for the following: AC input, DC load, external energy storage device, alternate DC power source, external control device, and central data acquisition and control. The AC input is typically designed for single phase 208–277 VAC at 50 or 60 Hz. Alternatively, the AC input can be designed for three phase 208–480 VAC at 50 or 60 Hz.

The multi-function power control unit operates an alternative source of DC direct current, in conjunction with an AC source of power or DC power storage device, in a dynamic manner that allows maximum power generating capability of the alternative source of DC direct current at the specific operating conditions of the moment. It also can deliver power in excess of that required by a DC compatible load to the AC source of power, DC power storage device, or both in a shared manner.

The system includes three major subsystems:

a Bi-directional Microprocessor-Controlled 4.5 kW AC to DC Power Supply;

a Buck/Boost DC-to-DC Converter with dynamic voltage control; and, a DC-Based Meter Monitoring of the AC I/O, DC I/O, and internal voltages and currents, which is based on a unique Metering and Control Module (MCM).

The aforementioned bi-directional AC/DC power supply of the present invention includes an AC/DC converter that performs three functions based upon signal from Digital Processor, including the following:

1) rectifies AC and provides regulated DC voltage (via DC isolation) when required by the load or Alternate DC source;

2) rectifies AC and provides regulated DC voltage to an external energy storage device; and, 3) inverts DC power from the alternate DC source or external energy storage and sends it back to the AC System.

A power factor correction circuit adjusts the power factor of the unit to a specified value.

Anti-islanding analog and/or digital logic circuits are used to detect loss of connection to utility grid or external synchronization source.

A bi-directional control module includes an analog and/or digital logic device that enables the bi-directional power supply to "invert" DC power. If this module is not installed the unit can only provide the above noted functions "1" and "2" but cannot provide function "3".

A DC isolation circuit electrically isolates DC output from AC input.

The bi-directional power supply powers a DC Load with High Voltage (250–400 Volts). The Direct Current (DC) load is a device that consumes power, such as a lighting ballast; lamp; solid state lighting, such as a light emitting diode (LED); a DC motor; an AC motor with variable frequency drive (VFD); or an Inverter. The load may feed power backwards for short durations, such as during braking of a motor.

A low voltage ON/OFF control shuts down all output circuits via a low voltage signal or via wireless communication device. However, another variation allows for a variable signal to dynamically control the voltage of the output circuits.

An alternate DC source DC/DC converter converts output of an alternate energy source to a voltage level suitable for the DC load. This converter has the ability to dynamically change the operating characteristics of an alternative energy source to permit optimization of power transfer or for proper interface with an alternative energy source, such as a photovoltaic (PV) device, a wind turbine, a fuel cell, or an engine driven cogeneration device.

In another variation, the converter is used to provide DC power back to the alternative energy source during periods of inactivity. For example, a wind turbine needs to maintain its direction into the wind, and yaw motors operate during periods of low wind before power production is achievable. Another example is the start-up of a fuel cell or cogeneration system, which may require fuel pumps, cooling pumps or other auxiliary equipment to be running before power production is achievable.

An external energy storage device stores DC power for use in supplying power to the DC load and/or alternate energy source, in the event of a loss of AC power, supplementing power to DC load when required, or supplementing power to AC system. Examples include a high voltage battery, a low voltage battery with DC/DC converter, a flow Battery, a flywheel, and a capacitor.

A digital processor monitors and controls power delivery to and from all sources and loads. The digital processor provides an interface for providing data and receiving control signals from the external central data acquisition and control unit. It may provide the following controls:

1) dynamic voltage control and/or current control supplied by an alternate DC Source;

2) an ON/OFF control of all output circuits;

3) an ON/OFF control for the bi-directional AC/DC power Supply;

4) dynamically change output voltage; and 5) dynamically change voltage of the DC link.

The digital processor also supplies the following data, if requested or required by the external central data acquisition and control unit:

1) volts, amps, and/or power delivered/supplied by the bi-directional AC/DC power supply;

2) volts, amps, and/or power delivered/supplied by the alternate DC source;

3) volts, amps, and/or power delivered/supplied by the external energy storage device;

4) volts, amps, and/or power delivered/supplied by the load; and, 5) system status, alarms, operating mode (i.e.: start-up, run, power failure, shutdown, fault, etc.)

The central data acquisition and control unit is used to provide the ability for central control and data collection of multiple power units, via their digital processors. It may be used for enterprise level and/or multi-building control, such as load management of utility feeder servicing multiple buildings.

The performance of the multi-function power control system of this invention for supplying a high efficiency lighting system is as follows: At this time, AC input high efficiency T-8 lighting ballasts operate an overall efficiency of 88%. A high voltage DC ballast is expected to operate at 94% efficiency. The multi-function power control system unit is expected to achieve a throughput efficiency of 96%. Thus, when combined, the overall efficiency can be 90%, which is 2% better than current systems. The main reason for the increase is due to the larger scale AC/DC power supply. This is analogous to central power plants with a distribution system being more efficient than the equivalent sum of multiple smaller scale power plants.

A larger scale system is also proposed. The current design is for a power unit that is sized to meet the requirements of a single phase 277 V lighting circuit (up to 4.5 kW). An upgrade is a three phase unit capable of supplying multiple lighting circuits, via a DC distribution system, and a single interconnection to the AC system. The larger scale system can be from 15 to 250 kW.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
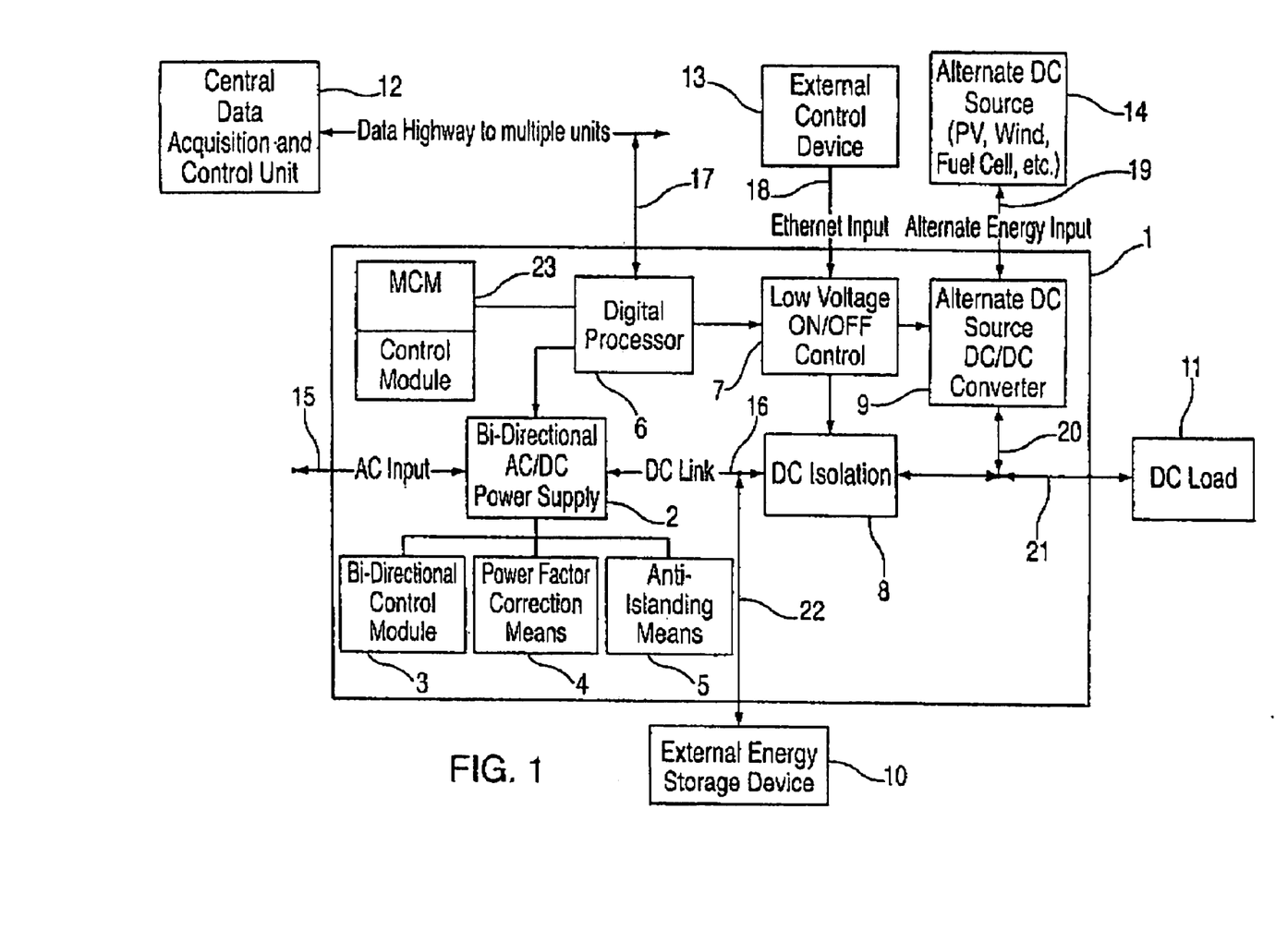
FIG. 1 is a Block diagram of a multi-function power control unit (MFPCU) of this invention with external attachment blocks.

FIG. 1 shows a block diagram of MFPCU 1 with a network of various functional blocks within and connections to other functional blocks at its periphery. bi-directional AC/DC Power Supply 2 is transformer isolated and has a bridge topology which incorporates MOSFETS or preferably IGBT's (insulated gate bipolar transistors) which permit operation as both a synchronous rectifier for supplying DC as well as an inverter to supply AC at its input from DC sources. bi-directional Control Module 3 controls the operation as to direction, while Power Factor Control Means 4 insures that power factor at the AC input remains essentially at unity. The Anti-Islanding Means 5 detects loss of AC utility power and blocks the feedback of AC power at the connection 15 from DC sources. Power supply 2 is controlled by Digital Processor 6. Low Voltage ON/OFF control 7 receives signals (such as emergency situations) from external control devices 13 via line 18 to shut down Alternate DC Source DC/DC Converter 9 or DC Isolation block 8. Alternate DC Sources 14 such as photovoltaic, wind turbines, fuel cells, etc. are connected via line 19. The connection is shown as bi-directional since the alternate DC sources may require power in some off modes such as for yaw motors for wind turbines or pumps which are required at start-up of fuel cells. DC Load 11 is connected via line 21 which is also shown as bi-directional wherein, on some occasions, DC loads can generate power. One example is a DC motor after shutdown which can act as a generator for a brief period.

Bi-directional line 20 permits sinking and sourcing of power from DC Isolation 8 or DC Load 11 with Alternate DC Source DC/DC Converter 9.

External energy storage device 10 stores DC power for use in supplying power to the DC load and/or alternate energy source, in the event of a loss of AC power, supplementing power to DC load when required, or supplementing power to AC system. Examples include a high voltage battery, a low voltage battery with DC/DC converter, a flow Battery, a flywheel, and a capacitor. External Energy Device 10 is connected via line 22. This connection is also bi-directional since a variety of energy storage devices require power during the charging phase. Simple chemical storage batteries such as lead acid or NiMH require periodic charging. Flow batteries require the use of circulation pumps in the charging process, and the motor/generator of a flywheel storage device is used as a motor to "charge" or spin-up the flywheel.

FIG. 1 also shows metering control module (MCM) 23, which contains various current and voltage sensors sampling the various sources and load points. These are all connected in a metering network, including metering control module 23, to digital processor 6. Central Data Acquisition and Control Unit 12 is an enterprise level digital processor which monitors and controls the operation from a central location. Besides soliciting sensor information from all MFPCU's, unit 12 also monitors the loading of the utility feeder line to the enterprise; in this way it can be used to control the .MFPCU's to limit the peak utility power used by adaptively sharing the power available with load requirements thereby reducing peak surcharges.

Figure 2:
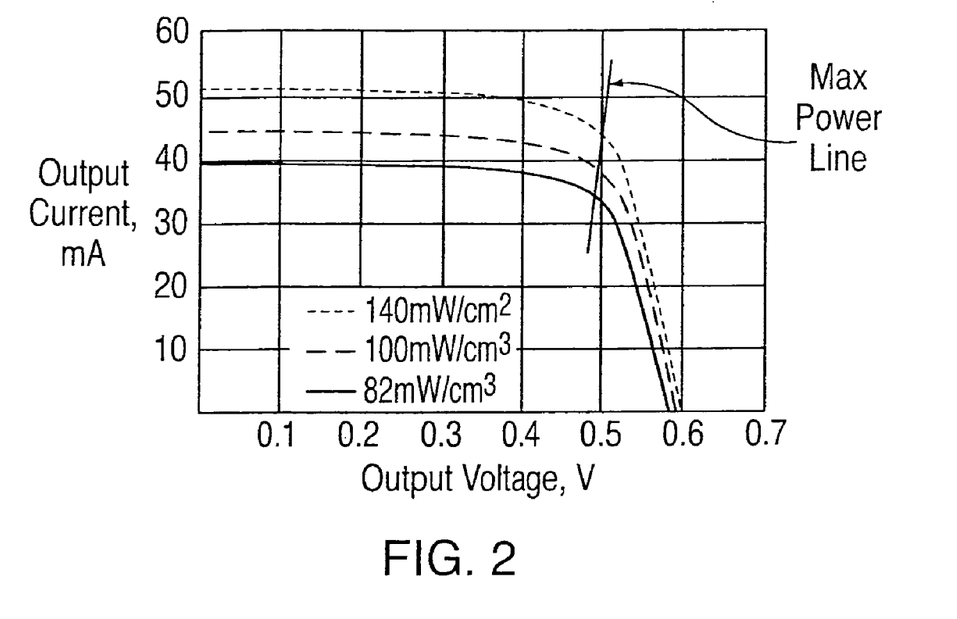
FIG. 2 is a chart of IV curves for typical solar cells showing maximum power load line.

FIG. 2 shows typical current/voltage curves for solar cells at different levels of incident irradiation (here ranging from 82 to 140 W/cm squared). The load line for maximum power collected is also drawn. The state-of-the-art control for extracting the maximum output from a solar array over varying operating conditions is known as maximum power point tracking or MPPT. This is achieved either by a predictive open-loop or by a closed-loop control system. In the MFPCU of this invention, MPPT is implemented by the buck/boost DC/DC converter of block 9 under control of digital processor 6. Solar panels used with the current MFPCU generate from 250 to 600 volts. The operating voltage of a lighting load is 380VDC+/−1%. Thus alternate DC source DC/DC converter 9 will maintain this output while the input varies from 250 to 600 VDC; this is done in conjunction with MPPT protocols to maximize power transfer over dynamically changing conditions such as incident radiation and ambient temperature.

Figure 3:
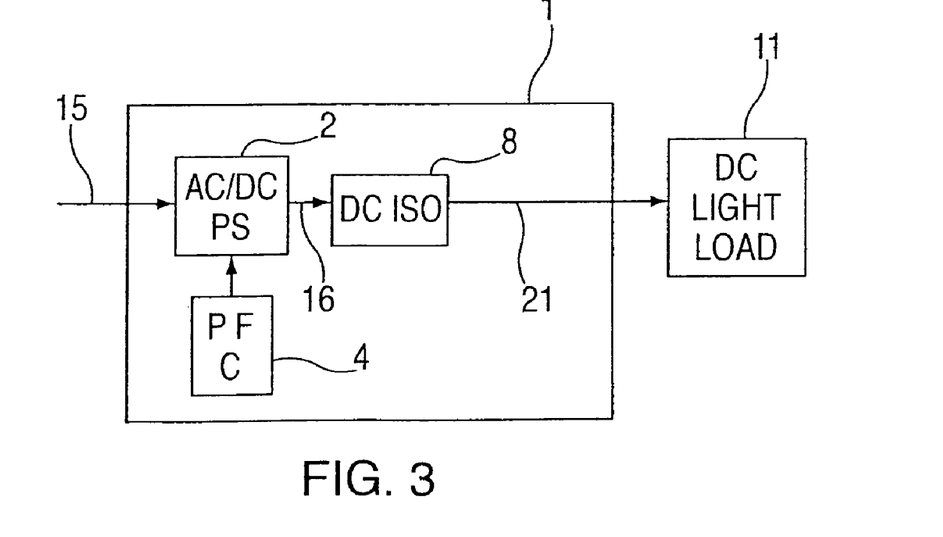
FIG. 3 is a Block diagram showing main current flow through the MFPCU for an AC Sourced High Efficiency Lighting mode.
Figure 4:
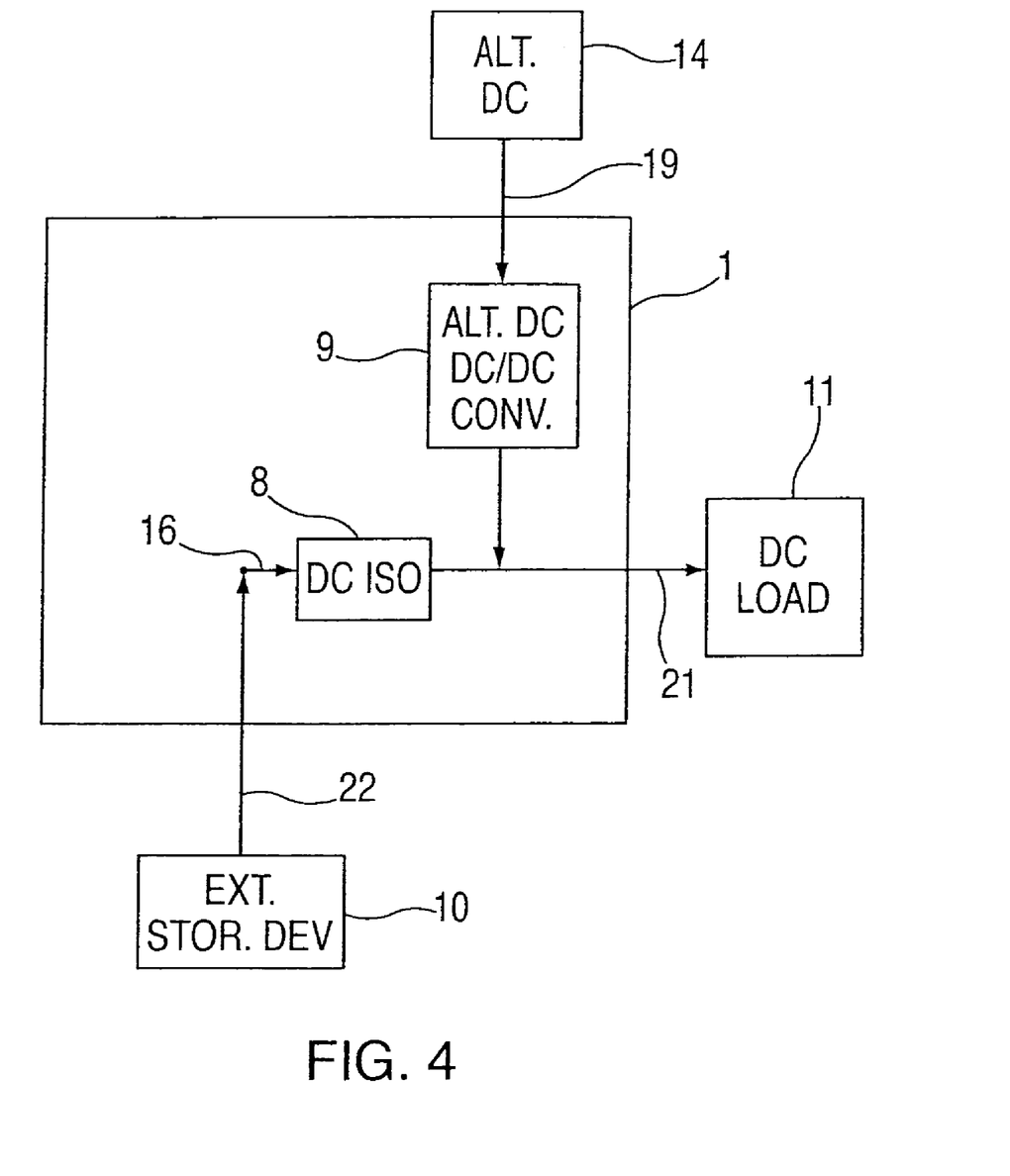
FIG. 4 is a Block diagram showing main current flow through the MFPCU for an AC Outage Operation mode.
Figure 5:
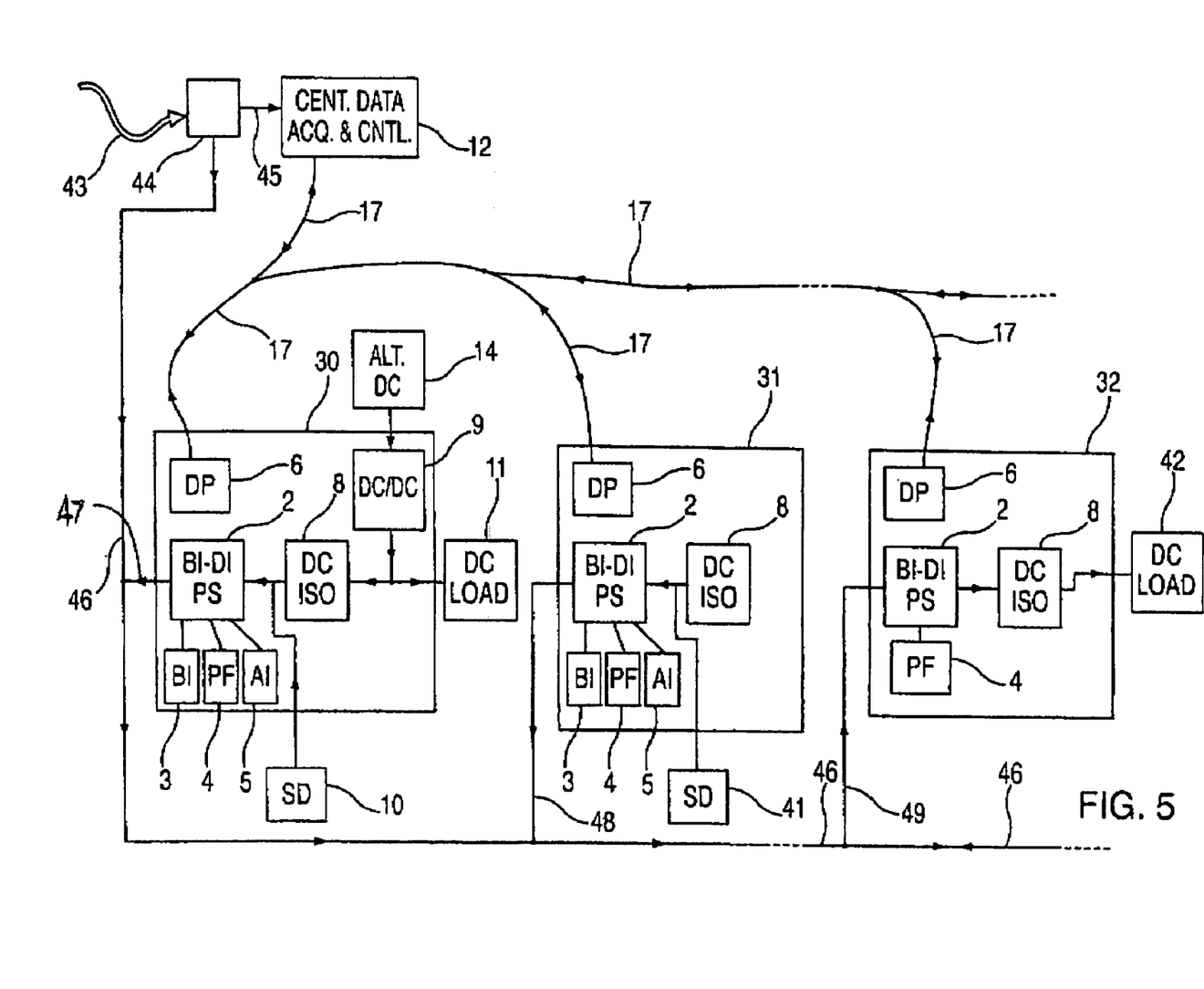
FIG. 5 is a Block diagram of enterprise with multiple MFPCU's in a Peak Shaving Enterprise AC Wheeling mode.

FIGS. 3–5 illustrate the main power flows through MFPCU blocks and paths for different modes of operation.

FIG. 3 shows the most typical mode of operation for an MFPCU. It illustrates AC sourced high efficiency lighting wherein load 11 is a fluorescent light load using DC-input ballasts. Utility AC power at 15 feeds into bi-directional AC/DC power supply 2 where it is converted (at unity power factor via power factor correction 4) to DC which flows toward DC isolation block 8 (via line 16) and onward to DC lighting load 11. In FIG. 3, no external storage device or alternate DC source are shown; they may simply not be implemented at this MFPCU, or they may just not be contributing power at this time.

FIG. 4 shows operation during a utility power outage. Power to supply DC load 11 is supplied via line 21 by alternate DC source 14 via line 19 through DC/DC converter 9 and by external storage device 10 via lines 22 and 16 through DC isolation block 8. Note that bi-directional power supply 2 is not involved in this operation since it is shut down by anti-islanding means 5.

FIG. 5 shows a multi-MFPCU enterprise operating so as to reduce power demand from utility feeder 43 entering distribution panel 44. Central data block 12 is sampling demand via line 45. Via network of bi-directional data lines 17, it can keep track of the status of each MFPCU. The distribution of utility power to each MFPCU is shown as a single line 46 (for simplicity) although multiple branch lines would probably be used. In this example, DC load 42 has heavy demand from MFPCU 32.

MFPCU 31 has its load shut down, but its storage device 41 has some capacity. MFPCU 30 is supplying its own load 11, but its storage device 10 has some capacity, and currently its alternate DC source 14 has capacity in excess of load 11 demand. Central data block 12 is aware of the status of each MFPCU and the impending peak utility demand threshold, therefore a "peak shaving" protocol is automatically entered. The bi-directional power supplies 2 of MFPCU's 30 and 31 are placed in inverter mode to feed back AC derived from DC sources via lines 47 and 48 respectively. This AC is combined with utility AC on branch lines 46 to supply heavy load 42 attached to MFPCU 32 via line 49. Note that bi-directional power supply 2 in MFPCU 32 remains in rectifier mode. Obviously there are an almost infinite number of similar scenarios that are possible on a second by second basis; this just illustrates a possible snapshot where AC is wheeled within the enterprise from one MFPCU to another.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. In a power sharing system in a DC load environment having:
   a source of AC;
   an alternative source of DC;
   a power controller capable of inputting voltage regulated DC power simultaneously from said sources, said alternative source of DC making a shared contribution of power selected by said power controller, and having a power junction means for delivering a regulated voltage DC to a DC compatible load at an output of said power sharing system;
   said power controller controlling supply side power sharing to a DC load side;
   said power controller having a converter converting AC inputted electrical power into a defined DC-regulated voltage to provide and manage power to said DC compatible load;
   said power controller producing voltage regulated power by controlling response of said alternative source of DC power;
   said power controller directing power from secondary sources of DC power to limit peak power supplied from said source of AC power to said DC power to limit peak power supplied from said source AC power to said DC compatible load in accordance with a pre-set threshold of power from said source of AC power in order to minimize peak power surcharges; the improvement comprising:
   means for operating said alternative source of DC in a dynamic manner that allows the utilization of all the power generating capability at the specific operating conditions of the moment; and,
   means for delivering power from said alternative primary power source of DC in excess of that required by said DC compatible load back to said source of AC.

2. The power system of claim 1 wherein said DC compatible load is selected from the group consisting of:
   a lighting system,
   a DC power consumption device;
   a lighting ballast;
   a lamp;
   solid state lighting;
   a DC motor;
   an AC motor with variable frequency drive (VFD); and/or
   an inverter.

3. The power system of claim 1 further comprising an external DC energy storage device.

4. The power system of claim 1 wherein said alternative source of DC is at least one of a photo voltaic energy source, a cogenerator, a wind energy conversion system and/or a fuel cell.

5. The power system of claim 1 wherein said source of AC is at least one of a utility AC grid; a generator and/or a stand alone inverter with a connected DC source.

6. The power system as in claim 3 in which said power controller combines power from said alternative source of DC and said external DC energy storage device, in the absence of power from said source of AC.

7. The power sharing system as in claim 6 further comprising a means to stop delivering of said DC to said AC source when said source of AC power is off and not present.

8. A power sharing system in a DC load environment including:
   a source of AC; and
   an alternative source of DC;
   said power sharing system comprising:
   a bi-directional isolated power supply for converting power from said source of AC to DC power;
   means for operating said alternative source of DC in a dynamic manner that allows the utilization of all the power generating capability at the specific operating conditions of the moment of said alternative source of DC;

a DC compatible load;

a converter for transforming the output of said alternative source of DC to a voltage level suitable for use by said DC compatible load;

a metering module for receiving data relating to power from said converter; providing data to a digital processor to control said bi-directional isolated power supply, to provide power for supplementing power insufficiency delivered by said converter, thereby supplying load requirements of said DC compatible load, and, said power system module including means for feeding back to said source of AC, through said bi-directional isolated power supply, power delivered by said converter, in excess of that required by said DC compatible load at any given time.

9. The power system of claim 8 wherein said DC compatible load is selected from the group consisting of:
a lighting system;
a DC power consumption device;
a lighting ballast;
a lamp;
solid state lighting;
a DC motor;
an AC motor with variable frequency drive (VFD); and/or
an inverter.

10. The power system of claim 8 further comprising an external DC energy storage device.

11. The power sharing system of claim 8 in which said alternative source of DC is at least one of a photovoltaic energy source, a wind energy conversion system, a cogenerator and/or a fuel cell.

12. The power system of claim 8 wherein said source of AC is at least one of a utility AC grid; a generator and/or a stand alone inverter with a connected DC source.

13. The power sharing system of claim 10 having an external DC storage device to supply DC power to said DC compatible load when there is a failure in said source of AC and said alternative source of DC produces insufficient power for said DC compatible load;

said system having a means for feeding back AC power in excess of that required by said DC compatible load at any given time from said external DC energy storage device into an AC input connection when said AC power source is operational.

14. The power sharing system as in claim 8 further comprising a means to prevent feeding back of said AC, when said source of AC power is turned off.

15. A multiple bi-directional input/output power control system comprising:
at least one power control unit having a network of functional blocks housed in a single enclosure, said unit providing DC power to at least one DC load,
said unit providing control and internal pathways sharing a plurality of power inputs, said inputs including:
an AC power source,
at least one alternative DC power source, and,
said unit having a means for feeding back AC power from said at least one DC power source into an AC input connection.

16. The multiple bi-directional input/output power control system as in claim 15 further comprising at least one external DC energy storage device.

17. The multiple bi-directional input/output power control system as in claim 15 wherein said at least one power control unit is a plurality of interconnected power control units.

18. The multiple bi-directional input/output power control system as in claim 15 where said functional blocks are selected from the group consisting of:
at least one hard wired electronic circuit board;
software running on an internal digital processor, and/or as a combination thereof.

19. The multiple bi-directional input/output power control system as in claim 15 wherein said network of functional blocks includes a digital processor, a low voltage ON/OFF control block, an alternate DC source DC/DC converter, a DC isolation block, and a bi-directional AC/DC power supply with a bi-directional control module, power factor correction means, an anti-islanding control block, and metering network including metering control module wherein:
said digital processor controls said functional blocks and gathers data from said metering network and metering control module;
said alternate DC source DC/DC converter conditions output of connected alternate source to match power requirements of said DC load;
said low voltage on/off control block permits direct external control of said DC isolation and said alternate DC source DC/DC converter; and,
said bi-directional AC/DC power supply providing connection to said source of AC for at least one of the following functions:
to provide power, with said power factor correction means to said DC connected load, and/or
to feed back AC power as directed by said bi-directional control module, with conditioning intervention by said power factor correction means, and safety interlock control by said anti-islanding control block.

20. The multiple bi-directional input/out power control system as in claim 16 wherein said at least one power control unit operates said alternative DC power source in conjunction with said AC source of power and/or said external DC energy storage device, in a dynamic manner allowing maximum power generating capability of said alternative DC power source at specific operating conditions of the moment.

21. The multiple bi-directional input/output power control unit as in claim 19 wherein said power control unit delivers power, in excess of that required by said at least one compatible load, to said AC power source, said external DC energy storage device, and/or a combination thereof both in a shared manner.

22. The multiple bi-directional input/output power control unit as in claim 15 wherein said means for feeding back AC power comprises a bi-directional microprocessor-controlled power supply.

23. The multiple bi-directional input/output power control unit as in claim 19 wherein said DC-to-DC Converter is a buck/boost converter with dynamic voltage controls.

24. The multiple bi-directional input/output power control unit as in claim 15 further comprising a DC-based meter,
said meter monitoring at least one of:
AC input/output,
DC input/output, and/or,
internal voltages and currents.

25. The multiple bi-directional input/output power control unit as in claim 19 wherein said bi-directional AC/DC power supply includes an AC/DC converter receiving at least one signal from said digital processor, and performing at least one function of the following functions:

1) rectifying AC and providing regulated DC voltage via DC isolation when required by said at least one DC load and/or said alternate DC power source;
2) rectifying AC and providing regulated DC voltage to said external DC energy storage device; and,
3) inverting DC power from said alternate DC power source or said external DC energy storage device and sending said DC power back to said AC power source.

26. The multiple bi-directional input/output power control system as in claim 19 wherein said power factor correction means adjusts a power factor of said power control unit to a pre-determined specified value.

27. The multiple bi-directional input/output power control system as in claim 19 wherein said anti-islanding means includes an analog and/or digital logic circuit detecting loss of connection to said AC power source grid and/or external synchronization source.

28. The multiple bi-directional input/output power control system as in claim 19 wherein said bi-directional control module includes an analog and/or digital logic device enabling said bi-directional power supply to invert DC power.

29. The multiple bi-directional input/output power control system as in claim 19 wherein said DC isolation block means electrically isolates DC output from said AC power source.

30. The multiple bi-directional input/output power control system as in claim 15 wherein said at least one DC load is selected from the group consisting of:
   a lighting system;
   a DC power consumption device;
   a lighting ballast;
   a lamp;
   solid state lighting;
   a DC motor;
   an AC motor with variable frequency drive (VFD); and/or
   an inverter.

31. The multiple bi-directional input/output power control system as in claim 19 wherein said low voltage ON/OFF control shuts down all output circuits via at least one of a low voltage signal and/or a wireless communication device.

32. The multiple bi-directional input/output power control system as in claim 19 wherein said low voltage ON/OFF control includes at least one variable signal dynamically controlling voltage of said output circuits.

33. The multiple bi-directional input/output power control system as in claim 19 wherein said alternate DC source DC/DC converter converts output of an alternate energy source to a voltage level suitable for said at least one DC load, said converter dynamically changing operating characteristics of said alternative energy source, permitting optimization of power transfer and/or permitting interface with said alternative DC energy source.

34. The multiple bi-directional input/output power control system as in claim 15 wherein said alternative DC energy source is at least one of:
   a photovoltaic (PV) device,
   a wind turbine,
   a fuel cell, and/or
   an engine driven cogeneration device.

35. The multiple bi-directional input/output power control system as in claim 16 wherein said external energy storage device stores DC power and supplies power to said at least one DC load and/or alternate energy source.

36. The multiple bi-directional input/output power control system as in claim 19 wherein said digital processor monitors and controls power delivery to and from a plurality of power sources and loads, said digital processor providing an interface for providing data and receiving control signals from an external central data acquisition and control unit.

37. The multiple bi-directional input/output power control system as in claim 19 wherein said digital processor provides at least one of:
   1) dynamic voltage control and/or current control supplied by an alternate DC Source;
   2) an ON/OFF control of all output circuits;
   3) an ON/OFF control for the bi-directional AC/DC power Supply;
   4) dynamically change output voltage; and
   5) dynamically change voltage of the DC link.

38. The multiple bi-directional input/output power control system as in claim 19 wherein said digital processor controls providing at least one of:
   1) volts, amps, and/or power delivered/supplied by the bi-directional AC/DC power supply;
   2) volts, amps, and/or power delivered/supplied by the alternate DC source;
   3) volts, amps, and/or power delivered/supplied by the external energy storage device;
   4) volts, amps, and/or power delivered/supplied by the load; and/or;
   5) system status, alarms and/or operating mode status.

39. The multiple bi-directional input/output power control system as in claim 36 wherein said central data acquisition and control unit provides central control and data collection of data from said multiple power units, via each respective digital processor.

40. The multiple bi-directional input/output power control system as in claim 39 wherein said central data acquisition and control unit includes an enterprise level digital processor monitoring and controlling operation from a central location, soliciting sensor information from each power control unit, said central data acquisition and control unit monitoring loading of said AC utility power source line to said enterprise, controlling each said power control unit to limit the peak utility power used, by adaptively sharing power available with requirements of said at least one DC load, thereby reducing peak surcharges.

41. A multiple bi-directional input/output power control system comprising a network of functional blocks housed in a single enclosure, said system providing DC power to at least one DC load, said system providing control and internal pathways sharing at least one of a plurality of AC and/or DC power inputs,
   said system feeding back AC power from said at least one DC power source into an AC input connection, said fed-back AC power shared by other AC loads,
   said system operating at least one alternative source of DC in a dynamic manner allowing maximization of power generating capability at respective specific operating conditions of the moment.

* * * * *

UNITED STATES PATENT AND TRADEMARK OFFICE
CERTIFICATE OF CORRECTION

PATENT NO. : 7,227,278 B2 Page 1 of 1
APPLICATION NO. : 10/761979
DATED : June 5, 2007
INVENTOR(S) : Richard A. Realmuto and Benjamin Hartman It is certified that error appears in the above-identified patent and that said Letters Patent is hereby corrected as shown below:

Claim 1, col. 5, line 67 change "and having a power junction means for delivering a regulated voltage DC to a DC compatible load at an output of said power sharing system" to --said power controller delivering a regulated DC voltage to a DC compatible load at an output of said power sharing system.--

Signed and Sealed this

Twenty-seventh Day of May, 2008

JON W. DUDAS
*Director of the United States Patent and Trademark Office*